Aug. 25, 1925.

R. P. PESCARA

JOY STICK

Filed April 4, 1922     3 Sheets-Sheet 2

1,550,739

INVENTOR.
R. P. Pescara.

Attorney.

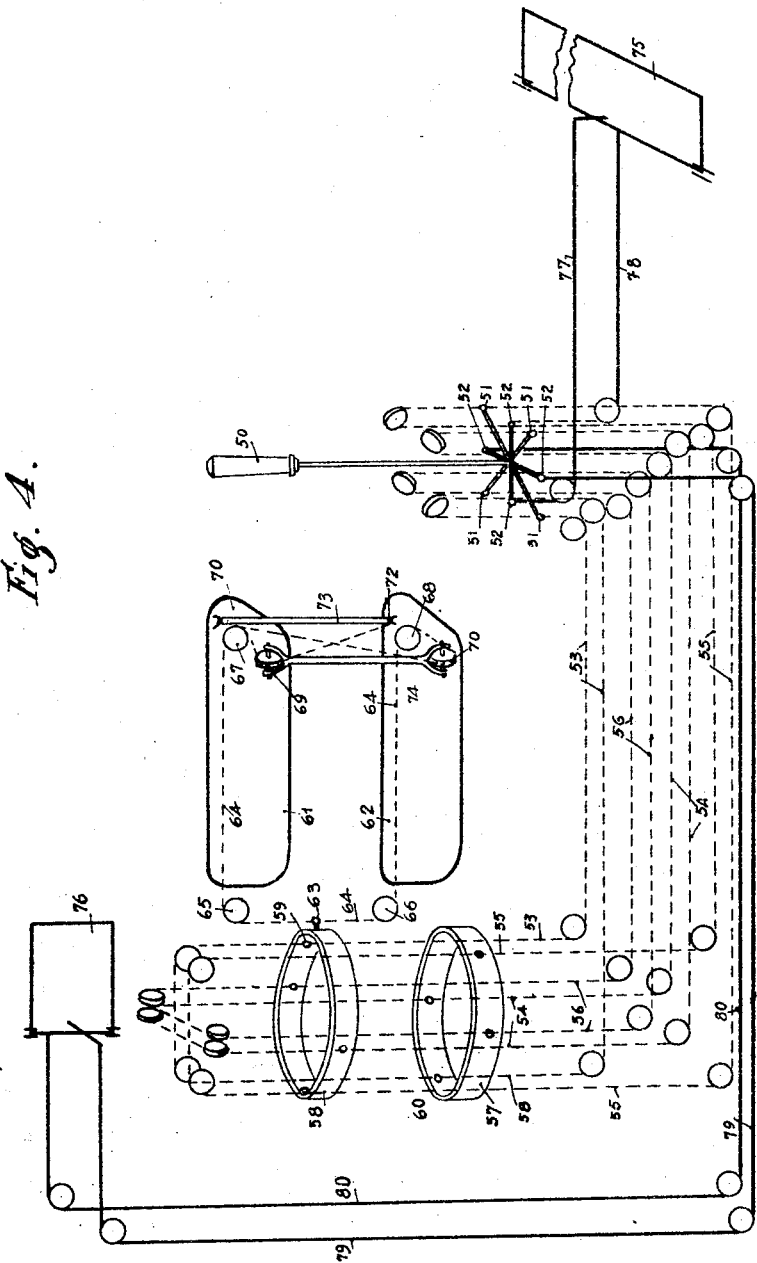

Patented Aug. 25, 1925.

1,550,739

UNITED STATES PATENT OFFICE.

RAUL PATERAS PESCARA, OF BARCELONA, SPAIN.

JOY STICK.

Application filed April 4, 1922. Serial No. 549,376.

*To all whom it may concern:*

Be it known that I, Marques RAUL PATERAS PESCARA, citizen of Argentine, and residing at 20 Calle Buenasuerte, Barcelona, Spain, have invented a new Joy Stick for Helicopters, of which the following is a specification.

The invention relates to an improvement in controls for helicopters, being particularly directed to that control commonly known as the joy stick. In the accepted type of aeroplanes, the stability of the machine relative to its horizontal axis is controlled by the joy stick, and the present invention is designed to utilizing the same control for helicopters by adapting the joy stick for certain special conditions of operation made necessary by the particular character of the helicopter.

In helicopter construction, the stability is provided for by warping the blades of the propellers relative to a fixed plane, with this warping means so arranged that the thrust of the propellers is increased in a certain sector of the circle swept by the propellers and correspondingly diminished in the opposite sector. The propeller thrust is thus decentered in the desired direction, thereby producing a torque which tends to control the inclination or stability of the machine, for example, either stabilizing an already inclined machine, or inclining a machine whose axis was originally vertical.

In horizontal flight, the stability is ordinarily obtained by the action of two rudders, that is, an elevator and a rolling rudder.

The invention is therefore directed to a joy stick arranged to control the warping of the blades and the elevator and rolling rudder at the will of the aviator.

The invention is illustrated in the accompanying drawings, in which:

Fig. 4 is a diagrammatic view showing the various control movements.

Figure 1:
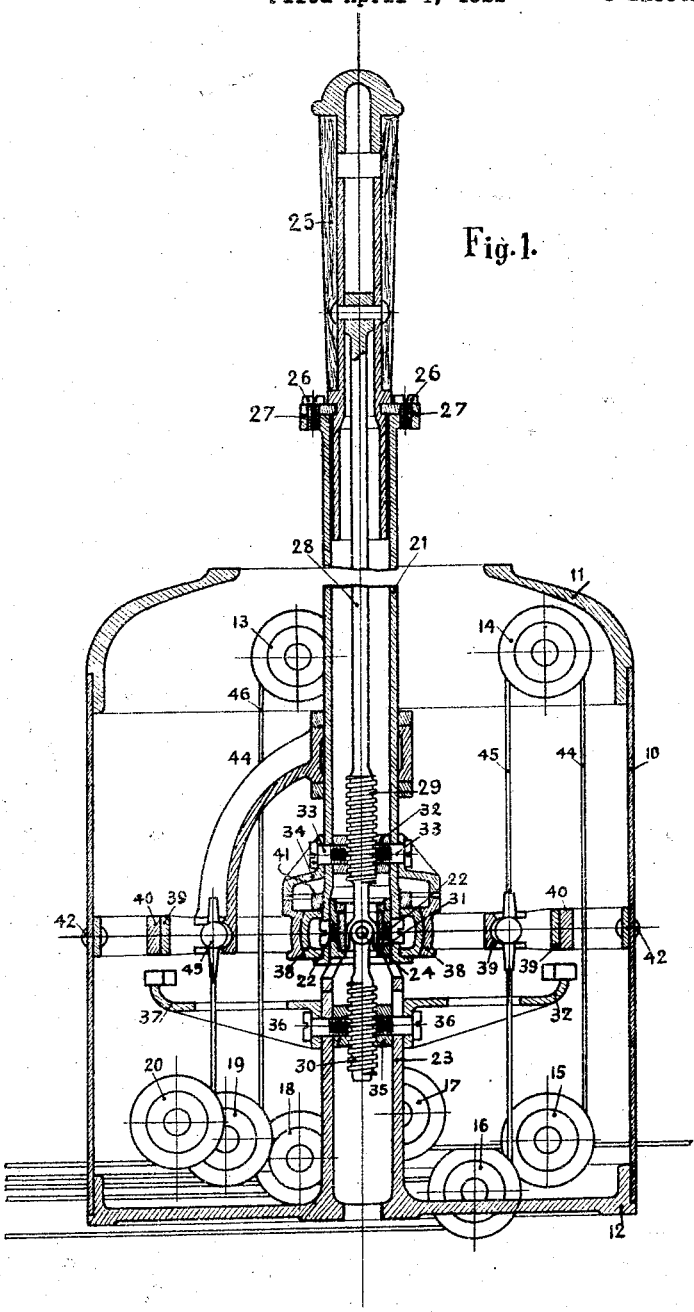
Fig. 1 is a vertical sectional view showing the joy stick and illustrating its various controls.

The joy stick assembly comprises a cylindrical casing 10, having what may be termed a cap piece 11 and a base 12. This cap piece and base support various sheaves or pulleys indicated at 13, 14, 15, 16, 17, 18, 19 and 20, over which the various control cables governed by the joy stick, as hereinafter described, may be guided.

The joy stick proper comprises a tubular member 21 supported on the universal joint connection 22 at the upper end of a hollow pillow 23 rising from the base 12. The upper end of the tubular section 21 has a lateral outstanding flange on which, through the medium of screws 26, is secured an annular disc or washer 27, the inner edge of which seats in an annular recess in a handle 25, whereby the handle is mounted for independent rotative movement and yet may induce swinging movements of the joy stick proper, as will be apparent. Fixed with relation to the handle and extending longitudinally of the joy stick, is a rod 28, formed near the lower end with a threaded portion 29. The lower end of the rod 28 is forked to embrace the cross piece at the upper end of a rod extension, which latter projects into the pillow 23 and is formed with a threaded portion 30. The threaded portion 29 of the rod 28 engages a nut 32 freely slidable in the joy stick section 21, a similar nut 35 being slidably mounted in the pillow 23 and cooperating with the threaded section 30 of the rod extension. The lower end of the section 21 of the joy stick has a lateral flange, and supported upon this flange is a guide 38, the guide being held fixed with relation to the section 21 by a nut threaded upon said section and bearing on the upper edge of the guide. The outer surface of the guide 38 is concentric at all points with the center 24 of the universal mounting for the joy stick, the outer surface of the guide thus forming a section of a sphere. Mounted for rocking movement on the guide 38, is an adjusting section 39. The inner substantially ring portion of this section is curved to fit the outer surface of the guide, and the outer ring portion of this section is also adapted to rockingly cooperate with the inner surface of an outer guide 40 secured at 42 to the casing 10. Thus the adjusting member 39 may be rocked in either direction in the appropriate movement of the joy stick. The inner and outer ring sections of the adjusting member 39 are connected by radial ribs between which are secured cross pieces recessed at 43 to receive balls 43', which balls are connected to certain cables, so that in the rocking of the adjusting member, the cables may be drawn in one direction or the other for the operation of certain parts which will later appear.

It is noted that the adjusting member 39, as described, is wholly free of the control of the joy stick, and as it is desirable to place it within such joy stick control at will, and to also prevent it from being operated by the joy stick at will, means are provided to secure this result, which are controlled by the turning of the handle 25 and the consequent operating, through the rod 28 and the rod extension, of the nuts 32 and 35. Secured to the nut 32 by screws 33 which pass through slots in the joy stick section 21, is a locking member 34, the lower circular edge 41 of which is designed, when the locking member is lowered, to bear squarely upon an upstanding edge of the inner ring section of the adjusting member 39. Thus when the handle 25 is turned to lower the locking member to engage the inner ring section of the adjusting member, the latter will, in effect, be locked to the joy stick, and therefore, any tilting movement of the joy stick will correspondingly tilt the adjusting member and operate the cables connected thereto. The lower adjusting nut 35 is correspondingly connected by screws 36 passing through slots in the pillow 23 to a limiting member 37, the upturned edge flange of which is formed to underlie and bear against the outer ring section of the adjusting member 39 and the guide 40 therefor. Thus when the handle has been turned in the appropriate direction and the limiting member moved upwardly to engage the adjusting section and guide, said adjusting section is locked rigid with the guide and is incapable of responding to the joy stick movements until the limiting section is lowered. Obviously, the locking member 34 and limiting section 37 act oppositely, that is, when the former is lowered into locking position, the latter is also lowered from limiting position. Thus the adjusting member 39 may be locked to respond to tilting movements of the joy stick, or held against any movement after being released from such locked relation to the joy stick.

It may be here stated, as will later more specifically appear, the adjusting member 39 is designed for the control of the decentering of the thrust of the propellers, and as such control is not necessary or desirable in the rapid horizontal flight of the machine, the described means for coupling or uncoupling this adjusting member with respect to the joy stick has been provided.

In addition to the adjusting member 39, which will be hereinafter termed the thrust adjusting member, there is provided, for control by the joy stick, a rudder adjusting member. This rudder adjusting member comprises a sleeve fixed upon the section 21 of the joy stick above the locking member 34 in any appropriate manner, and having radiating and downwardly curved arms 44 which terminate in the plane of and between the rib sections of the thrust adjusting member 39, as seen more particularly in Fig. 2. The terminals of the arms 44 of the rudder adjusting member are recessed to receive ball members 45 connected to the respective cables for operating the rudders. It will be apparent that the rudder adjusting member is at all times responsive to the tilting movement of the joy stick, while the thrust adjusting member may be made selectively responsive to such tilting of the joy stick at will.

In Fig. 4, is shown diagrammatically the operation of the joy stick control and the effect thereof in connection with the various stabilizing functions.

In this figure, the joy stick is generally indicated at 50, the thrust adjusting member at 51 and the rudder adjusting member at 52. The cables 77, 78, which control the elevator rudders 75, are connected to the diametrically opposed arms 44 of the rudder adjusting member, indicated in the diagrammatic view at 52, while the remaining pair of arms of this rudder adjusting member 52 is connected by cables 79 and 80 to the rolling rudder 76. Obviously therefore, these rudders may be accurately controlled by appropriate tilting movement of the joy stick.

Figure 2:
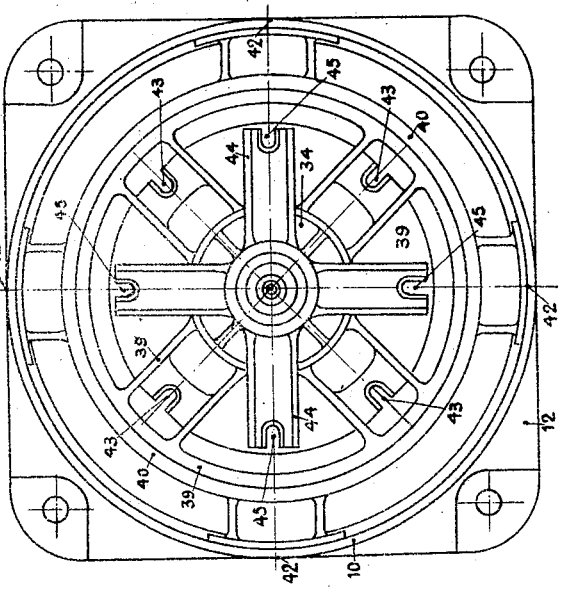
Figs. 2 and 3 are transverse sections through the same, the former being taken above the cable operating members, and the latter below the same.
Figure 3:
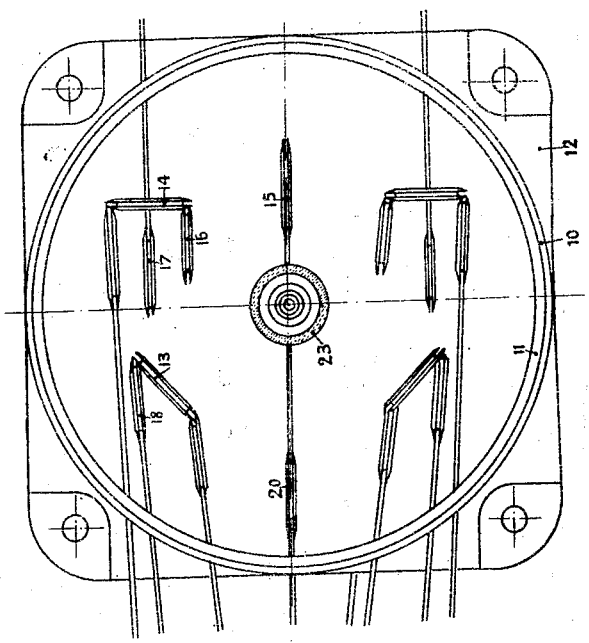

In order that the operation of the thrust adjusting member indicated in Figs. 1, 2, and 3, as 39, and in Fig. 4, as 51, may be better understood, a brief description will be given of the warping operation of one blade of one of the supporting elements or propellers.

61, 62, represent the opposing surfaces of one blade of the propeller, and between which surfaces, that is, within the frame of the blade, is arranged a cable 64, which passes over guide pulleys 65, 66, 67, 68, 69 and 70. A rigid blade strut 74 supports the axles of the pulleys 69 and 70, and the ends of the cable 64 are connected to the respective ends of a corresponding strut 73, which is disposed at the ends of the surface portions. The cable 64 is connected by a rigid connection to the outer raceway of a ball bearing 58, and it will be apparent that if this ball bearing is inclined to its axial line, the connector 63 will rise and fall in following the path of the inclined ball bearing. The cable 64 will move correspondingly and will therefore deform or warp the surfaces of the blades as will be evident. This change is of course periodic, as the cable 64 is moved downwardly and then upwardly during the rotation of the blades about their axis, so that the thrust of the blades will be at the maximum at directly opposite point in their circle of movement. As all blades are similarly controlled, it is apparent that the thrust will no longer pass through the axes of the propellers but will be decentralized. The respective cable points of the thrust adjusting member, indicated at 39, in Figs. 1, 2, and 3, and at 51 in Fig. 4, are connected by cables 53, 54, 55, and 56, guided over the various guiding pulleys indicated, and are connected to the ball bearings 57 and 58 involving inner and outer raceways. Each control cable is connected in its rising portion to the inner ring of one of these ball bearings, and in its descending portion to the inner ring of the other of such ball bearings. For example, cable 53 is attached in its rising portion to the inner ring of ball bearing 58, and in its descending portion to the inner ring of ball bearing 57, as at 60. These connections of any one cable to the respective ball bearings are arranged in the same vertical plane passing through the common axis of the bearings. The ball bearings are connected to the general frame work of the machine by means of joints of any desired general formation, which permit of the bearings being inclined in any direction around a fixed point with that point the intersection of the plane of rotation with the axis of the propellers. If, therefore, the joy stick be inclined with the thrust adjusting section connected thereto as described, the planes of the ball bearings will assume a position parallel to that of the thrust adjusting section. Thus the decentralizing of the thrust of the propellers is provided for in selective degree.

What I claim is:

1. A joy stick mounted for universal movement, a propeller thrust adjusting member normally free of the joy stick, and means whereby said member may be connected to the joy stick for operation in the movement of the latter, said means being operable in a predetermined movement of the joy stick.

2. A joy stick mounted for universal movement, a propeller thrust adjusting member normally free of the joy stick, and means whereby said member may be connected to the joy stick for operation in the movement of the latter, and means for locking the thrust adjusting member against movement.

3. A joy stick mounted for universal movement, a propeller thrust adjusting member normally free of the joy stick, and means whereby said member may be connected to the joy stick for operation in the movement of the latter, and means for locking the thrust adjusting member against movement, said latter means being controlled through a predetermined movement of the joy stick.

4. A joy stick mounted for universal movement and including a revoluble handle portion, a rod operated in the movement of the handle, a thrust adjusting member, locking means to connect said adjusting member to the joy stick, locking means to hold the thrust adjusting member against movement, and means operated by the rod for simultaneously and reversely operating both said locking means.

5. A joy stick mounted for universal movement and including a revoluble handle portion, a rod operated in the movement of the handle, a thrust adjusting member, locking means to connect said adjusting member to the joy stick, locking means to hold the thrust adjusting member against movement, means operated by the rod for simultaneously and reversely operating both said locking means, and a rudder adjusting member connected to the joy stick.

6. A joy stick mounted for universal movement about a center, a thrust adjusting member capable of swinging movement about said center, a locking member carried by the joy stick to engage and connect said thrust adjusting member to the joy stick, and means operable through a turning movement of the joy stick to adjust the locking member toward and from the thrust adjusting member.

7. A joy stick mounted for universal movement about a center, a thrust adjusting member capable of swinging movement about said center, a locking member carried by the joy stick to engage and connect said thrust adjusting member to the joy stick, means operable through a turning movement of the joy stick to adjust the locking member toward and from the thrust adjusting member, and blade warping cables connected to and operated in the movement of the thrust adjusting member.

8. A joy stick mounted for universal movement about a center, a thrust adjusting member capable of swinging movement about said center, a locking member carried by the joy stick to engage and connect said thrust adjusting member to the joy stick, means operable through a turning movement of the joy stick to adjust the locking member toward and from the thrust adjusting member, and means operated in the turning movement of the joy stick to fix the thrust adjusting member against movement without interfering with the movement of the joy stick.

In testimony, that he claims the foregoing as his invention, he has signed his name.

RAUL PATERAS PESCARA.